K. P. KIDDER.
Bee Hive.
No. 28,871.
Patented June 26, 1860.
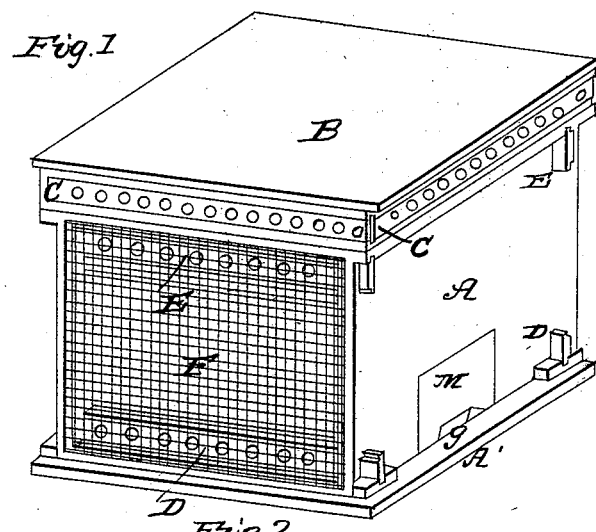
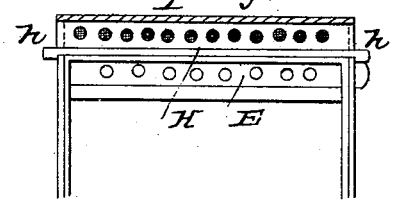
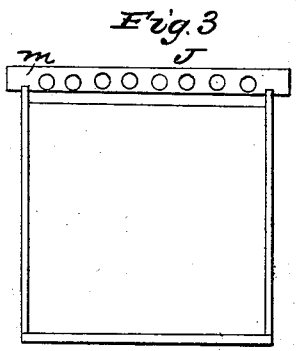
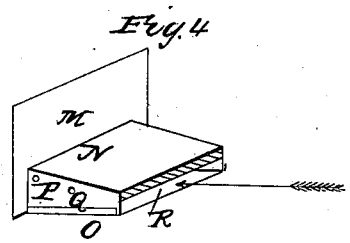
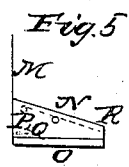
WITNESSES
Lyman Cumming
Wm. Weston
INVENTOR
Kimball P. Kidder

UNITED STATES PATENT OFFICE.

KIMBALL P. KIDDER, OF BURLINGTON, VERMONT.

BEEHIVE.

Specification of Letters Patent No. 28,871, dated June 26, 1860.

*To all whom it may concern:*

Be it known that I, KIMBALL P. KIDDER, of Burlington, in the county of Chittenden and State of Vermont, have made a new, useful, and Improved Beehive; and I do hereby declare that the following is a full, clear, and exact description of the construction and operation of the same, reference being had to the accompanying drawings, forming a part of this specification, in which—

Figure 1, is a perspective view; Fig. 2, a side elevation of the upper part of the hive, when the cover is removed; Fig. 3, a view of one of the comb frames, removed from the hive; Fig. 4, a perspective view of the bee catcher or retainer, and Fig. 5 a side view of the same.

Like parts are indicated by the same letters in all the figures.

To enable others skilled in the art to make and use my invention, I will now describe its construction and operation.

A (Fig. 1) is the body of the hive, of the usual material and dimensions, and provided with a fixed bottom A'. B is the removable cover, which fits on over the top of the hive, and rests on flanges $h$, (see Fig. 2.) The four sides of this cover are provided with ventilating slides, C, through which, as shown in Fig. 1, is a series of small holes, about one half inch in diameter, corresponding to which are similar holes in the cover and top of the hive, H, Fig. 2, so that, by moving said slides, the space of half an inch, the amount of several square inches of ventilating openings can be obtained, or, by moving them the same distance, all the openings can be closed. The holes, in H, are covered, on the inner side, with wire gauze. D and E are similar ventilating slides at the top and bottom of two opposite sides of the hive, the object of which slides is to still further ventilate the hive, and also allow the bees to come out and remain confined between the side of the hive and the wire gauze F,—the space between the two being about an inch. These spaces between the gauze and outer sides of the hive are especially calculated for the transportion of bees from one place to another, as then the animal heat of the swarm is greatly increased and a corresponding increase of ventilation is required.

I, (Fig. 2) is the movable honey board.

Fig. 3, is a representation of one of the movable comb frames, the top piece J, being provided with a series of holes $m$, the object of which is to afford a ready passage to the bees from one comb to another, instead of their being compelled to travel round under the same, and thereby expose themselves, in winter weather, to being chilled, as the top of the hive, owing to the ascent of the animal heat of the bees, is always very considerably warmer than the bottom. The holes will also be useful, in the honey season, by affording a shorter passage from comb to comb, and a consequent saving of time.

The bee catcher, or retainer, is made of sheet iron, tin, zinc, or other suitable material, and shaped as represented in Figs. 4, and 5.

To one side of the flat sheet M, is soldered, or otherwise fastened, the box, N, which is furnished with a bottom, O. The length of N should be about four and one half inches and the width two and one half inches. At the bottom of M, as shown in Fig. 1, is an opening, $g$, high enough to admit the bees.

P is a wire, passing from one side to the other of the box N, and forming a pivot to which the little sheet metal slats, or valves, R, are attached and on which they are free to move. Q is another wire, passing from side to side of the box N, to support the ends of the slat R, and keep them from dropping too near to the bottom, O, the space between the outer ends of said slats and the bottom, O, being about the eighth of an inch, or so small that a bee cannot enter in the direction of the arrow, in Fig. 4, and, in the opposite direction, only by raising one of the valves. Thus the hive, being provided with an entrance suitable to receive the box N, it is obvious that the bee catcher may be so applied as either to retain all the bees that are in, or may enter, as in Fig. 1, or to prevent any from entering, as would be the case were the instrument reversed, and the flat piece M, applied to the entrance.

1. To capture a swarm of robber bees, the catcher should be applied as represented in Fig. 1, and the hive supplied with a little honey, and also some water, half a pint or more, put into some empty comb. All the bees that enter will be retained. At the expiration of some two days and a half, the captured swarm should be supplied with a fertile queen, if captured in the latter part of the season, but if captured before the honey season fairly sets in, then eggs, or young brood, placed in the hive previous to capturing the bees, will answer as well.

2. The bee keeper will find the instrument of great utility in protecting his hives from robber bees from the woods, or elsewhere, as he can capture all the robbers and make them work for him. To do this, a decoy hive, supplied with a few pounds of honey, should be put in the place of the one that is being robbed. The hive that is besieged should be removed a few feet away and closed until evening, and then the robbers within it should be allowed to depart. When they return the next morning, they will enter the decoy hive if it stands where the old one stood.

3. When it is desirable to remove a swarm, all the bees belonging to it, can, by the use of this device, be collected and confined at any time of the day, in about half an hour, for they are seldom absent longer than that length of time.

4. This instrument can be reversed, and all the bees, when expelled from the hive, are prevented from reëntering it, or it may be made use of in transferring a swarm from one hive to another.

5. When a honey box is removed, it is often filled with bees, which, if the box is left open for them to escape, they will frequently rob it and carry the honey back to the hive. This, however, can be prevented by applying my improved catcher, as above, to one of the holes and closing the rest, thus allowing a free exit but no reëntrance.

Having fully described my invention, what I claim as new and desire to secure by Letters Patent, as an improvement in beehives, is—

The removable and reversible bee catcher, or passage-way $g$, shown in Fig. 4, provided with a series of pivoted pendent doors, or slats, R, arranged and applied to the beehive, in the manner and for the purposes specified.

KIMBALL P. KIDDER.

Witnesses:
Wm. Weston,
Wm. G. Shaw.